United States Patent Office 2,771,171
Patented Nov. 20, 1956

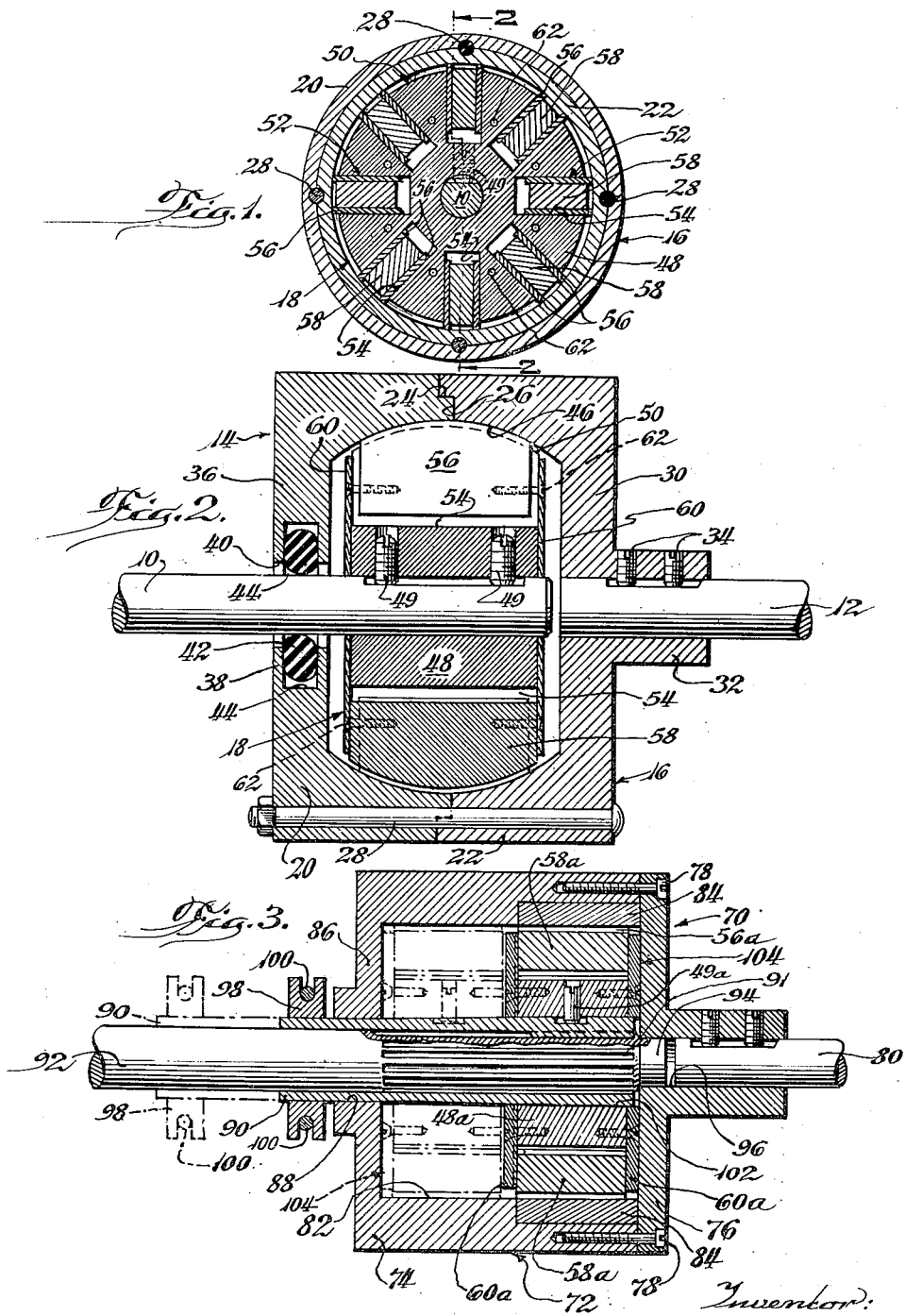

2,771,171

MAGNETICALLY ACTIVATED TORQUE COUPLING

Oswald C. Schultz, St. Joseph, Mich., assignor to Laboratory Equipment Corporation, St. Joseph, Mich., a corporation of Michigan Application July 6, 1955, Serial No. 520,196

9 Claims. (Cl. 192—84)

The present invention relates to torque couplings.

One object of the invention is to provide for transmitting torque between a torque input member and a torque output member an improved magnetically activated torque limiting coupling capable of holding the torque input member against slipping or overrunning relative to the torque output member until the torque applied to the coupling by the torque input member reaches a predetermined value, the coupling being operable automatically as an incident to the application thereto of torque at the predetermined value to permit overrunning of the input member relative to the output member and to apply during overrunning of the input member torque to the output member at a uniform value substantially unaffected by the speed of overrunning of the input member relative to the output member and substantially equal to the predetermined torque value at which the coupling permits overrunning of the input member to begin.

A related object is to provide a torque limiting coupling of the character recited in which the uniformity of the torque output characteristics of the coupling over a wide range of overrunning speeds between the members connected through the coupling is not affected significantly by the presence of oil on any or all of the coupling components.

A further object is to provide an improved torque limiting coupling of the above character which has an inherently long service life in that the operational capabilities of the coupling remain substantially unimpaired by even extensive wear of component parts subject to friction.

An additional object of the invention is to provide an improved coupling of the character set forth which is readily adjustable to reduce to any degree desired the effective torque transmitting capacity of the coupling.

Another object is to provide a magnetically activated coupling of an improved construction which is exceptionally well suited for transmitting torque between structural members subject to misalignment in any one or more of three degrees—axial, radial, and angular.

Other objects and advantages will become apparent from the following description of the exemplary forms of the invention shown in the drawings, in which:

Figure 1 is a transverse sectional view of a coupling embodying the invention;

Fig. 2 is a longitudinal sectional view on an enlarged scale of the coupling taken along the line 2—2 of Fig. 1; and Fig. 3 is a longitudinal sectional view of a coupling embodying a modified form of the invention.

Adapted to transmit torque between two generally coaxial shafts 10 and 12, Fig. 2, the magnetically activated torque limiting coupling 14 forming the illustrated embodiment of the invention comprises a hollow magnetic drum assembly 16 attached to the shaft 12 and encircling a magnetic rotor assembly 18 attached to the shaft 10.

Generally cylindrical over all, the drum assembly 16 is constructed in two axial half sections 20, 22 shaped to fit together circumferentially in surrounding relation to the rotor assembly 18. Adjoining circumferential edges 24, 26 of the two drum sections 20, 22 are shaped with an axially stepped configuration, as shown, or other shaping capable of positively preventing radial displacement relative to each other of the drum sections, which are held together axially by axial bolts 28 or the like.

Attachment of the drum assembly 16 to the shaft 12, as previously mentioned, is effected by a web 30 integral with the end of the drum section 22 adjacent the shaft 12 and extending radially inward to an outwardly extending axial boss 32 integral with the web 30. Centrally bored to receive the shaft 12, the boss 32 is fixed against rotation on the shaft 12 by setscrews 34 or the like.

Abrasive particles and the like are excluded from the interior of the drum assembly in the construction shown by means forming a seal around the shaft 10. For this purpose a web 36 integral with the outer end of the drum section 20 extends radially inward to an inner peripheral edge 38 defining a central opening 40 receiving the shaft 10 and having a diameter substantially larger than that of the shaft. A seal between the web 36 and the shaft 10 is formed by a resilient O-ring seal 42 of a conventional construction closely encircling the shaft and extending slidably into an inwardly open circumferential groove 44 formed in the web edge 38. The depth of the groove 44 and the radial flexibility of the seal 42 are such as to permit continuous radial movement of the shaft 10 in any direction within the central web opening 40.

The two half sections 20, 22 of the internally hollow drum assembly 16 are shaped between the two radial webs 30, 36 to define within the assembly a concave annular surface 46. The curvature of the surface 46 is that of a sphere truncated by the webs 30, 36 and having a center of curvature located on the extended axis of the shaft 12 substantially midway between the webs 30 and 36.

Mounted on the shaft 10 within the space encircled by the annular drum surface 46, the rotor assembly 18 comprises a rotor body 48 centrally bored to receive the shaft 10 and fixed against rotation on the shaft by setscrews 49 or the like. The overall shape of the rotor body 48 is that of a sphere symmetrically truncated at opposite ends with respect to the axis of the shaft 10 to have a length somewhat less than the spacing between the drum assembly webs 30, 36. The radius of curvature of the exterior, truncated spherical surface 50 of the rotor body 48 is somewhat less than that of the annular drum surface 46, thus providing substantial clearance in all directions, Fig. 1, between the rotor body and the adjacent internal surfaces of the drum assembly 16.

The two axial sections 20, 22 of the drum assembly 16 are formed of a magnetic material, iron in any suitable form. Hence, the internal annular drum surface 46 is immediately backed up by the annulus of magnetic material which defines this surface. The rotor body 48, on the other hand, is formed from a nonmagnetic material, preferably aluminum.

Rotation of the rotor body 48 and the drum assembly 16 relative to each other is resisted by a plurality of individual magnetic units 52 mounted in the rotor body to react magnetically and by magnetically induced friction on the adjacent drum structure.

The respective magnetic units 52 (eight, as shown) are mounted in holders 54 formed by a plurality of circumferentially spaced radial slots (also denoted by the numerals 54) defined in the rotor body 48. Opening radially outward toward the annular drum surface 46 and extending from end to end of the rotor body 48, each slot 54 has a radial depth somewhat greater than one-half the maximum radius of the rotor body.

Each magnetic unit 52 comprises two flat pole pieces 56, Figs. 1 and 2, formed from sheet steel or other suitable magnetic metal and having a generally rectangular shape. The two pole pieces 56 are placed in opposite sides of the holder slot 54 for the unit in substantially parallel relation to the axis of the rotor body 48. Radially slidable along the adjacent side wall of its holder slot 54, each pole piece 56 has a radially outward edge shaped with an arcuate curvature to conform to the cross-sectional shaping of the adjacent drum surface 46 along the axis of the drum assembly.

The width of each pole piece 56 measured radially with respect to the axis of the rotor 48 is somewhat less than the radial distance from the drum surface 46 to the bottom of the holder slot 54 for the pole piece thus providing clearance for movement of each pole piece radially within its holder slot to follow the surface 46 under different operating conditions to be referred to presently in greater detail. For the same general purpose each pole piece 56 has a length along the axis of the rotor, Fig. 2, somewhat less than the length of the rotor body 48, thus providing clearance within the holder slot 54 for the pole pieces to move axially with respect to the rotor.

Both pole pieces 56 of each magnetic unit 52 are activated magnetically by a flat permanent magnet 58 sandwiched between the two (Figs. 1 and 2) and forming a part of the magnetic unit. Generally similar in shape to the adjacent pole pieces 56, each magnet 58 has a width measured radially with respect to the rotor slightly less than the corresponding width of the pole pieces and a length substantially equal to that of the rotor. The thickness of each magnet 58, as shown, is approximately three times that of the adjacent pole pieces 56 but only a fraction of either the length or width of the magnet.

Formed of a material having a high magnetic retentivity and a high coercive force, each magnet 58 is permanently magnetized to have strong magnetic poles of opposite polarity on opposite faces of the magnet adjacent the respective pole pieces 56. Although the invention is not necessarily limited to any specific magnetic material in the construction of the magnets 58, a highly satisfactory material commercially available for this purpose is ceramic in character having essential components of barium carbonate and iron oxide. Such material is known by Phillips of Holland as "Ferrox-Dur." The material is also known under the name "Indox."

To prevent the magnets 58 from slipping along the axis of the rotor out the longitudinal ends of the slots 54, two nonmagnetic retaining rings 60 are secured by screws 62 to opposite ends of the rotor body 48 to extend radially beyond the radially inner ends of the slots.

The magnetic flux of opposite polarity emanating from the opposite faces of each magnet 58 flows through the adjacent pole pieces 56 and attracts the latter toward the adjacent magnetic material of the drum assembly 16 thus making surface contact between the curved outer radial edges of the pole pieces and the annular friction surface 46. The direct surface engagement of the pole pieces 56 of each magnetic unit with the interposed magnet 58 and with the magnetic material of the drum assembly defining the surface 46 provides for the magnetic unit a closed magnetic circuit of extremely high permeability. In this connection it will be appreciated that the magnetic material of the drum assembly 16 forms a magnetic bridge of very low magnetic reluctance between the radially outer edges of the two pole pieces 56 of each magnetic unit.

The high flux intensity thus produced in the magnetic circuit of each magnetic unit 52 has the effect of magnetically urging the two pole pieces 56 of the unit hard against the adjacent friction surface 46, thus creating frictional resistance to movement of the pole pieces circumferentially along the friction surface. It is noteworthy that the magnetic force urging each pole piece 56 hard against the friction surface 46 is by its nature well distributed along the pole piece to maintain optimum frictional contact between the pole piece and the friction surface under all operating conditions.

The frictional reaction to movement of the pole pieces 56 along the drum surface 46, produced as an incident to the magnetic forces urging the pole pieces hard against the drum surface, is utilized in transmitting torque between the rotor assembly 18 and the drum assembly 16. The moment or torque value about the axes of the rotor and drum assemblies 18 and 16 of the friction between the pole pieces 56 and the drum surface 46 is effective for transmitting torque between the rotor assembly and the drum assembly and at the same time preventing rotary movement of the two assemblies relative to each other until the torque applied to the coupling for transmission therethrough reaches a predetermined value sufficient to overcome the substantially static friction between the pole pieces and the frictional surface 46. Hence, the shaft 10 or 12 serving as the torque input member to the coupling is prevented from turning or overrunning with respect to the other shaft serving as the torque output member until the torque supplied through the input shaft reaches the predetermnied value, just mentioned, at which the pole pieces 56 automatically begin to slide along the surface 46 to allow overrunning of the torque input shaft in relation to the torque output shaft.

Since the coefficient of sliding friction of the pole pieces 56 on the friction surface 46 during overrunning of the torque input member and the attached coupling assembly (either the rotor assembly 18 or the drum assembly 16) is substantially less than the coefficient of static friction between the pole pieces and the friction surface existing before overruuning of the input member and the attached coupling assembly begins, it might very well be expected that the torque delivered through the coupling to the torque output member would drop proportionately upon the beginning of relative rotation between the rotor assembly 18 and the drum assembly 16.

However, it has been found that the torque delivered by the coupling during slipping or overrunning of the torque input member through the coupling in relation to the torque output member remains steady at approximately the same torque value required for initiating overrunning of the torque input member in the maner described. Moreover, the torque delivered through the coupling to the torque output member during overrunning of the torque input member remains substantially unaffected by the rotary speed at which the torque input member overruns with respect to the output member. Further, these operational capabilities of the coupling remain generally unimpaired by the presence of oil on the drum surface 46 engaged by the pole pieces 56.

Without necessarily limiting the invention to any particular theory of operation, it may be helpful to explore briefly possible explanations for the capacity of the coupling to permit overrunning of the torque input member and at the same time deliver torque to the torque output member at a substantially uniform torque value, which is generally unaffected by the relative overrunning speed of the torque input member and substantially equal to torque value required to initiate overrunning of the torque input member relative to the torque output member.

In general it appears that the reduction in friction of the pole pieces 56 on the frictional surfaces 46 incident to the beginning of sliding movement of the pole pieces along the frictional surface is minimized by the inherent capacity of the magnetic attraction existing between the pole pieces and the adjacent drum assembly structure to maintain optimum frictional contact between the pole pieces and the frictional surface 46 at all times—even when the friction surface is covered with oil.

Moreover, it appears that this minimized reduction in friction between the pole pieces 56 and the frictional surface 46 incident to overrunning of the driving member relative to the driven member connected through the coupling is automatically compensated for by a magnetic torque reaction generated between the various magnetic units 52 and the adjacent material of the drum assembly 16 upon rotation of the rotor assembly 18 relative to the drum assembly.

Since the two pole pieces 56 of each magnetic unit 52 opposing the annular surface 46 in circumferentially spaced relation along the latter have opposite polarity, rotation of the rotor assembly 18 relative to the drum assembly 16 subjects the material of the latter backing up the surface 46 to rotating magnetic fields. To the degree that the material of the drum assembly 16 backing up the surface 46 is a conductor for electric current, the rotating magnetic fields passing through this material set up eddy currents in the drum assembly. These in turn produce magnetic effects which react magnetically with the magnetic fields of the units 52 to effect a magnetic torque reaction in opposition to turning movement of the rotor assembly 18 with respect to the drum assembly 16.

A second magnetic torque reaction cumulative with that incident to the development of eddy currents within the structure of the drum assembly 16 may be attributed to a hysteresis effect produced in the individual particles of the magnetic material of the drum assembly upon being subjected to the magnetic fields of opposite polarity sweeping across the particles from the pole pieces 56 as the rotor assembly 18 turns with respect to the drum assembly. Thus each magnetic particle of the drum structure backing up the friction surface 46 has a coercive force resistant to changes in magnetization of the particle by the rotating magnetic fields of opposite polarity emanating from the pole pieces 58. This coercive force or resistance to changes in magnetization of the magnetic particles of the drum assembly reacts magnetically with the magnetic fields of the magnetic units 52 to create additional torque resistance to rotation of the rotor assembly 18 in relation to the drum assembly 16 as previously mentioned.

In brief, the magnetic units 52 and the material of the drum assembly 16 banking up the surface 46 react together magnetically as an incident to rotation of the rotor assembly 18 in relation to the drum assembly to provide a magnetic torque resistance to such rotation which substantially compensates for the drop in frictional resistance between the pole pieces 56 and the friction surface 46 incident to the beginning of turning movement between the rotor assembly and the drum assembly in the manner described.

The torque transmission characteristics inherent in the improved torque limiting coupling thus provided are of decided advantage in many industrial applications as will appear to those skilled in the art.

The improved torque limiting coupling has in addition to the advantages of its torque transmitting characteristics an inherent capability to compensate for misalignment of the connected torque members in any one or more of three degrees—axial, radial, and angular. Thus in addition to serving as a torque limiting coupling of superior operational characteristics, the approved coupling provided can perform the function of a "flexible" coupling providing for free, though limited, movement of the coupled torque members in any linear or angular direction in relation to each other.

Axial misalignment or end play between the torque members 10 and 12 connected through the coupling is accommodated by the freedom of the rotor body 48 connected to the shaft 10 to shift axially with respect to the drum assembly 16 and with respect to the pole pieces 56 in engagement with the truncated spherical surface 46 on the drum assembly. Axial movement of the rotor body 48 with respect to the drum assembly 16 is retarded only by the frictional resistance of the pole pieces 56 in contact with both the rotor body and the drum assembly. As previously mentioned, the length of the pole pieces 56 along the axis of the rotor is somewhat less than the spacing between the nonmagnetic retainers 60 on opposite ends of the rotor body thus providing clearance for axial shifting movement of the rotor body with respect to the pole pieces.

Clearance for radial shifting movement of the rotor body 48 and hence the torque member 10 with respect to the drum assembly 16 attached to the torque member 12 is provided by the previously described radial clearance or space between the annular drum surface 46 and the exterior opposing surface 50 of the rotor body. In the event of radial misalignment between the torque members 10 and 12 and hence between the rotor assembly 18 and the drum assembly 16, the pole pieces 56 of the several magnetic units 52 may slide radially within the rotor slots 54 (which as previously mentioned provide radial clearance for this movement) to remain in firm contact with the drum surface 46 as the coupling rotates in operation. Consequently, the torque transmitting characteristics of the coupling are not substantially affected by limited radial misalignment between the torque members 10 and 12.

The ability of the coupling to compensate for angular misalignment between the coupled torque members 10 and 12 and hence between the rotor assembly 18 and the drum assembly 16 is provided by the capability of the rotor body 48 to turn in any direction about the center of curvature of the truncated spherical drum surface 46. Rotation of the coupling when there is angular misalignment between the axes of the attached torque members 10 and 12 produces swinging movement of any given circumferential segment of the outer annular surface 50 of the rotor body 48 from side to side with respect to the annular drum surface 46. However, this action does not interfere with proper operation of the coupling as the pole pieces 56 may slide along either the rotor body 48 or the drum surface 46 as necessary to compensate for relative movement between the two.

It is fitting to point out that the useful service life of the coupling thus provided is prolonged indefinitely by the fact that its operational capabilities remain unimpaired by even very substantial wear on any or all component parts subjected to friction in use. Frictional forces within the coupling are for the most part concentrated between the radially outward edges of the pole pieces 56 and the annular drum surface 46. However, any wear which may occur on either the pole pieces 56 or the surface 46 is fully compensated for automatically by the ability of the pole pieces 56 to move radially outward to any extent necessary to remain in contact with surface 46. It will be noted with reference to Fig. 1 that the pole pieces 56 have an initial radial width somewhat in excess of that of the magnets 58 to allow for any wear on the parts over a virtually unlimited service life.

It is also noteworthy that any clearance which may develop between the pole pieces 56 and the adjacent side walls of the rotor holder slots 54, due to frictional wear, will have substantially no effect on the operational capabilities of the coupling. The two pole pieces 56 and the magnet 58 of each magnetic unit 52 are held snugly together by the magnetic force on the magnet. Ordinarily the frictional drag on each magnetic unit 52 is in only one direction, circumferentially with respect to the axis of the coupling, thus holding the magnetic unit snugly against the holder slot 54 for the unit even though the latter may have a width somewhat greater than that of the magnetic unit.

If desired, provision may be made for adjusting the torque transmitting capacity of a coupling incorporating the invention without otherwise affecting its torque transmitting characteristics. An exemplary form of the invention modified to include this feature is illustrated in Fig. 3.

As shown in Fig. 3, the torque limiting coupling 70 embodying the modified form of the invention comprises a drum assembly 72 formed in two axial sections 74, 76 secured together by axial screws 78. The drum section 76 located at the right hand end of the coupling, Fig. 3, is centrally fixed to a torque shaft 80 which may constitute either a driving or driven member for the coupling. The other coupling section 74 is generally cylindrical in shape and defines an inner cylindrical surface 82 substantially coaxial with the torque shaft 80.

Both drum sections 74 and 76 are formed from aluminum or other nonmagnetic material except for an inner cylindrical inlay 84 of magnetic material mounted in the right hand end of the drum section 74 adjacent the drum section 76 and defining the right hand end of the previously mentioned drum surface 82. In the illustrated construction, the drum surface 82 is of uniform diameter along its entire length. The axial length of the magnetic inlay 84 and hence the axial length of the drum surface defined by the inlay, as shown, is slightly less than one-half of the overall length of the drum surface 82.

A disclike web 86 integrally formed on the end of the drum section 74 opposite the drum section 76 extends radially inward to define a central bearing 88 in axial alignment with the torque member 80. The bearing 88 provides radial support to a cylindrical sleeve 90 of sufficient length to extend from a short distance outside the drum assembly 72 all the way through the interior space circled by the drum surface 82.

The right hand end of the sleeve 90 is internally splined to form a nonrotatable, axially slidable connection with external, axial splines 91 on a second torque shaft 92 extending from left to right through the sleeve. The right hand end 94 of the shaft 92 is piloted in a bore 96 formed in the drum section 76 and receiving, as shown, the other shaft 80. An externally grooved operatng ring 98 is fixed to the left hand end of the sleeve 90 for use with a bifurcated actuator 100 or the like in shifting the sleeve axially along the shaft 92.

The right hand end of the sleeve 90 fits into a central opening 102 formed in a rotor assembly 104 disposed within the space encircled by the drum surface 82 and having a construction generally similar to that of the rotor 18 of the first form of the invention previously described. Essentially, the rotor assembly 104 differs from the rotor assembly 18 of the first form of the invention in that the outer annular extremity of the assembly 104 is generally cylindrical in shape from end to end of the rotor rather than being formed with the previously described crowned configuration of the assembly 18.

To simplify the description, components of the rotor assembly 104 forming counterparts of similar structure of the previously described rotor assembly 18 are designed by the same reference numerals with the addition of the subscript "a." A more detailed description of the rotor 104 may be gleaned, if desired, from a reference back to the previous description of similar structure embodied in the rotor assembly 18.

The effective width of the rotor body 48a and of the pole pieces 56a along the axis of the rotor assembly 104 is approximately equal to the axial length of the magnetic drum assembly inlay 84.

Hence, upon shifting of the rotor assembly 104 into axial alignment with the inlay 84, by actuation of the sleeve 90 through the ring 98, the rotor assembly is brought to maximum effective torque transmitting relation with the drum assembly 72. Coaction of the rotor assembly 104 with the drum inlay 84 to transmit torque between the coupled shafts 92 and 80 is generally similar to the previously described cooperation in this respect of the rotor assembly 18 and the drum assembly 16 of the first form of the invention.

To reduce the torque transmitting capacity of the modified coupling shown in Fig. 3 to any desired extent, it is necessary merely to shift the rotor assembly 104 to the left to reduce the degree of axial alignment between the rotor assembly and the magnetic drum insert 84. This adjustment of the axial position of the rotor assembly 104 can be effected simply through axial movement of the sleeve 90 by the ring 98.

Upon movement of the rotor assembly 104 to its extreme inoperative position, indicated in phantom in Fig. 3, in which the magnetic pole pieces 56a are axially displaced beyond the magnetic drum insert 84, the torque transmitting capacity of the coupling is reduced substantially to zero. Thus, the modified coupling can perform a clutching function in addition to its function as a torque limiting coupling having an adjustable torque transmitting capacity.

While I have shown and described preferred embodiments of my invention, it will be apparent that numerous variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. A magnetically activated torque limiting coupling adapted for use between two structural members rotatable one with respect to the other, comprising, in combination, drum means defining an annular interior surface facing radially inward toward the axis of said surface, said drum means including magnetic material immediately backing up said annular surface thereon, said drum means being adapted for connection to one of the structural members, a circular rotor body of nonmagnetic material adapted for connection to the other structural member and shaped and dimensioned to fit at least partially within the space encircled by said annular drum surface, said rotor body as such being freely turnable with respect to said drum means, said rotor body defining a plurality of circumferentially spaced outwardly open radial slots therein, a pair of generally flat magnetic pole pieces slidably mounted in each of said rotor slots at opposite sides thereof for free radial movement into engagement with said drum surface, and a generally flat permanent magnet sandwiched between each pair of pole pieces, each magnet having magnetic poles of opposite polarity on opposite sides thereof immediately contiguous to the respective pole pieces adjacent thereto.

2. A magnetically activated torque limiting coupling comprising, in combination, two generally coaxial torque members each adapted for connection with coacting torque transmitting structure, one of said members defining an annular friction surface backed up by magnetic material, the other member defining a plurality of nonmagnetic holders circumferentially spaced around the axis thereof and open toward said annular friction surface in adjacent relation thereto, two magnetic pole pieces slidably mounted in each holder for movement into contact with the adjacent annular surface, and a permanent magnet sandwiched between the two magnetic pole pieces in each holder and defining two magnetic poles of opposite polarity on opposite sides thereof facing said respective pole pieces.

3. A magnetically activated torque limiting coupling adapted for use between two torque members rotatable one in relation to the other, comprising, in combination, drum means adapted for connection with a torque member and defining a concave annular surface of truncated spherical curvature, said drum means including magnetic material backing said annular surface thereon in close proximity thereto, a circular rotor body of nonmagnetic material adapted for connection to another torque member and forming a convex annular surface of truncated spherical curvature similar in shape to said annular drum surface but having a radius of curvature somewhat less than that of the latter whereby the portion of said rotor body bounded by said annular surface thereon can fit within the space encircled by said drum surface with substantial radial play in relation to said drum means, said rotor body defining a plurality of circumferentially spaced holders therein open radially outward through said annular surface thereon, a pair of magnetic pole pieces slidably mounted in each of said rotor holders at opposite sides of the latter for free movement into engagement with the adjacent drum surface, the outermost edges of said pole pieces being shaped to conform to said drum surface, said pole pieces being dimensioned for movement with respect to the rotor body along the axis of the latter, and a permanent magnet sandwiched between the pole pieces in each holder and having opposite magnetic poles on opposite sides thereof immediately contiguous to the respective pole pieces.

4. A magnetically activated torque limiting coupling comprising, in combination, first torque transmitting means defining an annular friction surface having a truncated spherical curvature, said first torque transmitting means including magnetic material backing up said annular friction surface thereon, second torque transmitting means substantially coaxial with said first torque transmitting means and including nonmagnetic means defining a holder open toward said friction surface of said first torque transmitting means in adjacent relation thereto, said first and second torque transmitting means being rotatable one relative to the other, two magnetic pole pieces slidably mounted in said holder for engagement with said annular friction surface, the edges of said pole pieces adjacent the friction surface being shaped to conform thereto, and a permanent magnet effectively interposed between said pole pieces and having opposite magnetic poles on opposite sides thereof facing the respective pole pieces to create magnetic attraction between said pole pieces and said magnetic material of said first torque transmittive means to create frictional contact of said pole pieces with said friction surface.

5. A magnetically activated torque limiting coupling adapted for use between two torque members and comprising, in combination, drum means adapted for connection to a torque member and defining a generally cylindrical interior surface, said drum means including magnetic material circumferentially backing up an axial portion of said cylindrical surface thereon, the remaining axial portion of said cylindrical surface being formed and backed up by nonmagnetic material, a nonmagnetic rotor body substantially coaxial with said drum means, said rotor body being adapted for connection with a torque member and dimensioned to fit rotatably within the space encircled by said drum means surface, said rotor body defining circumferentially spaced nonmagnetic holders therein open radially outward toward said cylindrical drum means surface in adjacent relation thereto, two magnetic pole pieces slidably mounted within each holder at opposite sides thereof for engagement with said cylindrical surface, a permanent magnet sandwiched between the two pole pieces in each nonmagnetic holder and defining opposite magnetic poles on opposite sides of the magnet facing the respective pole pieces, and coupling adjusting means connected to said rotor body for effecting axial movement thereof with respect to said drum means to vary the degree of alignment along the axis thereof of said pole pieces with the axial portion of said drum surface backed up by said magnetic material to regulate the effective torque transmitting capacity of the coupling.

6. A magnetically activated torque limiting coupling adapted to transmit torque between two torque members, comprising, in combination, drum means adapted for connection to a torque member and defining an annular friction surface thereon, said drum means including magnetic material circumferentially backing up said friction surface, rotor means substantially coaxial with said drum means and adapted for connection with a torque member, said rotor means including a nonmagnetic holder defining a space therein opening toward said drum means surface, said rotor means including said holder being radially spaced from said drum means surface to provide radial clearance for radial movement between said rotor means and said drum means, two magnetic pole pieces slidably mounted in said holder in spaced relation to each other and extending therefrom for engagement with said friction surface, and a permanent magnet sandwiched between said pole pieces in immediate contact therewith, said magnet defining magnetic poles of opposite polarity on opposite sides thereof in contact with said respective pole pieces to create a magnetic circuit extending through both pole pieces and the adjacent portion of the said magnetic material of said drum means.

7. A magnetically activated torque limiting coupling capable of transmitting torque between two torque members, comprising, in combination, drum means adapted for connection to a torque member and defining an annular friction surface, said drum means including magnetic material circumferentially backing up said annular surface thereon, rotor means adapted for connection to a torque member and including means forming a nonmagnetic holder defining a space therein opening toward said annular drum means surface, said rotor means being shaped and dimensioned in relation to said drum means to provide axial clearance for movement with respect to said drum means along the axis of the latter, two magnetic pole pieces slidably disposed in said holder in spaced relation to each other and extending from the holder for engagement with said drum means surface, and a generally flat permanent magnet sandwiched between said pole pieces in contiguous relation thereto, said magnet defining magnet poles of opposite polarity on opposite sides thereof facing said respective pole pieces to create a magnetic circuit extending therethrough to the adjacent magnetic material of said drum means.

8. A magnetically activated torque limiting coupling having an adjustable torque transmitting capacity, comprising, in combination, means defining an annular friction surface and including magnetic material circumferentially backing up said friction surface, rotor means substantially coaxial with said friction surface and freely rotatable with respect thereto, said rotor means including a nonmagnetic holder defining a space therein opening toward said friction surface, a pair of magnetic pole pieces slidably mounted in said holder in spaced relation to each other for engagement with said friction surface, a permanent magnet sandwiched between said pole pieces in contact therewith and having magnetic poles of opposite polarity on opposite sides thereof facing said respective pole pieces, means for adjusting said rotor means and said friction surface defining means axially one with respect to the other, and means restricting movement of said pole pieces with respect to said rotor means along the axis of the latter whereby axial adjustment of said rotor means with respect to said friction surface varies the degree of axial alignment between said pole pieces and said magnetic material backing up said friction surface to regulate the effective torque transmitting capacity of the coupling.

9. A magnetically activated torque limiting coupling comprising, in combination, means defining an annular friction surface and including magnetic material circumferentially backing up said surface, means rotatable with respect to said surface in substantially coaxial relation thereto and including a nonmagnetic holder defining a space therein opening toward said annular surface in adjacent relation thereto, a pair of magnetic pole pieces slidably disposed in said holder in spaced relation to each other and extending from the holder for engagement with said annular surface, and a thin permanent magnet sandwiched between said pole pieces and defining magnetic poles of opposite polarity on opposite sides thereof adjacent said respective pole pieces for creating a magnetic circuit extending through both pole pieces and the adjacent portion of said magnetic material backing up said friction surface.

References Cited in the file of this patent

UNITED STATES PATENTS

| | | |
|---|---|---|
| 432,209 | McLaughlin | July 15, 1890 |
| 1,056,545 | Huebner | Mar. 18, 1913 |
| 2,147,204 | Laird | Feb. 14, 1939 |

FOREIGN PATENTS

| | | |
|---|---|---|
| 1,043,043 | France | June 10, 1953 |